(12) United States Patent
Benveniste et al.

(10) Patent No.: US 6,353,871 B1
(45) Date of Patent: Mar. 5, 2002

(54) DIRECTORY CACHE FOR INDIRECTLY ADDRESSED MAIN MEMORY

(75) Inventors: Caroline D. Benveniste, New York; Peter A. Franaszek, Mount Kisco; John T. Robinson, Yorktown Heights, all of NY (US); Charles O. Schulz, Ridgefield, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/256,572

(22) Filed: Feb. 22, 1999

(51) Int. Cl.[7] ............................................. G06F 12/08
(52) U.S. Cl. ........................................ 711/3; 711/118
(58) Field of Search ............................... 711/118, 122, 711/117, 203, 205, 207, 3

(56) References Cited

U.S. PATENT DOCUMENTS

| | | | |
|---|---|---|---|
| 5,412,787 A | * 5/1995 | Forsyth et al. ............... | 395/400 |
| 5,713,003 A | * 1/1998 | DeWitt et al. ............... | 395/445 |
| 5,729,228 A | 3/1998 | Franaszek et al. ........... | 341/106 |
| 5,813,031 A | * 9/1998 | Chou et al. .................. | 711/122 |
| 5,864,859 A | 1/1999 | Franaszek .................... | 707/101 |
| 5,903,911 A | * 5/1999 | Gaskins ....................... | 711/141 |
| 6,151,685 A | * 11/2000 | Li et al. ........................ | 714/6 |
| 6,173,381 B1 | 1/2001 | Dye ............................. | 711/170 |
| 6,212,602 B1 | * 4/2001 | Wicki et al. ................. | 711/122 |

* cited by examiner

Primary Examiner—Hiep T. Nguyen
(74) Attorney, Agent, or Firm—Scully, Scott, Murphy & Presser; Robert P. Tassinari, Esq.

(57) ABSTRACT

A system including a CPU, memory, and compression controller hardware, and implementing a first directory structure included in a first memory wherein CPU generated real memory addresses are translated into one or more physical memory locations using the first directory structure, further includes a second directory cache structure having entries corresponding to directory entries included in the first directory structure. In a first embodiment, the second directory cache structure is implemented as part of compression controller hardware. In a second embodiment, a common directory and cache memory structure is provided for storing a subset of directory entries in the directory structure together with a subset of the memory contents.

26 Claims, 6 Drawing Sheets

DIRECTORY CACHE FOR INDIRECTLY ADDRESSED MAIN MEMORY

FIELD OF THE INVENTION

The present invention relates generally to memory addressing schemes in computer systems, and specifically, to a directory system and method for reducing memory access latency in systems where CPU generated real addresses are translated to access data contents of main memory systems by means of a directory structure.

BACKGROUND OF THE INVENTION

An emerging development in computer organization is the use of data compression in a computer system's main memory, such that each cache line may be compressed before storage in main memory. The result is that cache lines, which in conventional computer systems that do not use main memory compression are of a uniform fixed size in the main memory, now, using memory compression, occupy varying amounts of space.

Techniques for efficiently storing and accessing variable size cache lines in main memory can be found in U.S. Pat. No. 5,761,536, and in co-pending U.S. patent application Ser. No. 08/603,976, entitled "COMPRESSION STORE ADDRESSING", both assigned to the assignee of the present invention. The techniques require the use of a directory structure, in which real memory addresses generated by the CPU(s) (or processors) of the computer system are used to index into the directory, which is then used to find the main memory contents containing the compressed data. In contrast, in conventional computer systems that do not use compressed main memory, real memory addresses are used directly as main memory addresses. An example of a compressed main memory system and directory structure is now described with reference to FIGS. 1–2.

Figure 1:
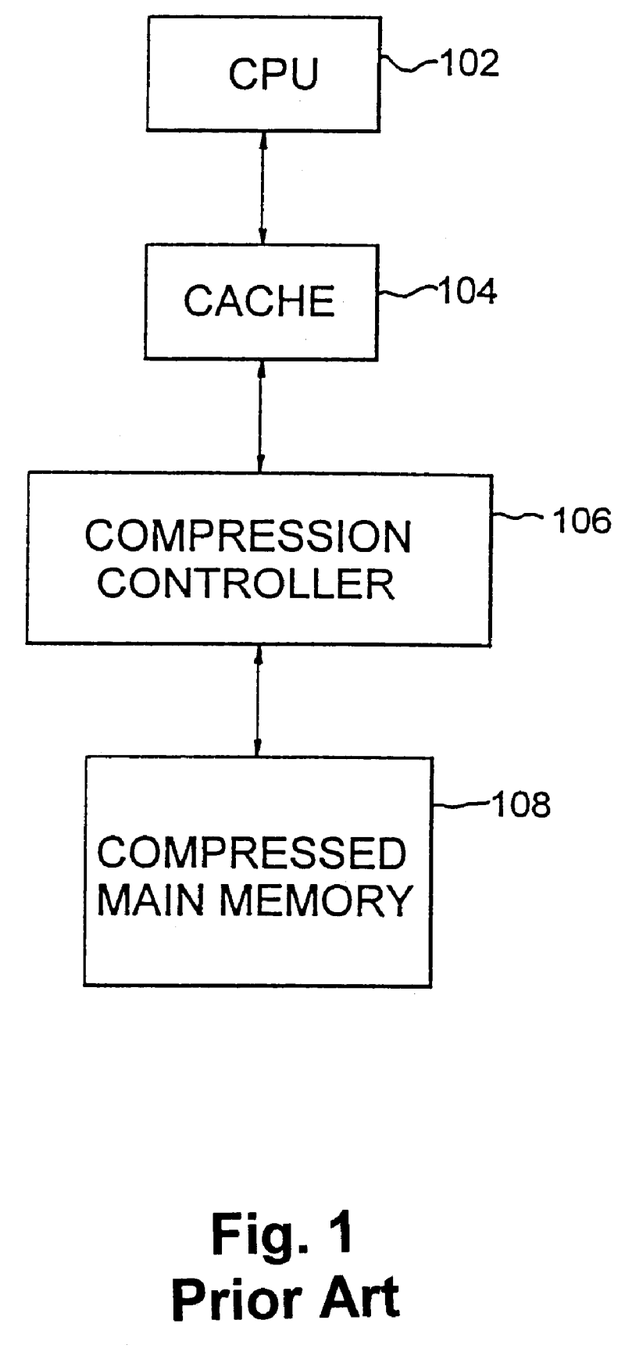
FIG. 1 illustrates generally a conventional computer system implementing compressed main memory.

FIG. 1 shows the overall structure of an example computer system using compressed main memory. A CPU 102 reads and writes data from a cache 104. Cache misses and stores result in reads and writes to the compressed main memory 108 by means of a compression controller 106.

Figure 2:
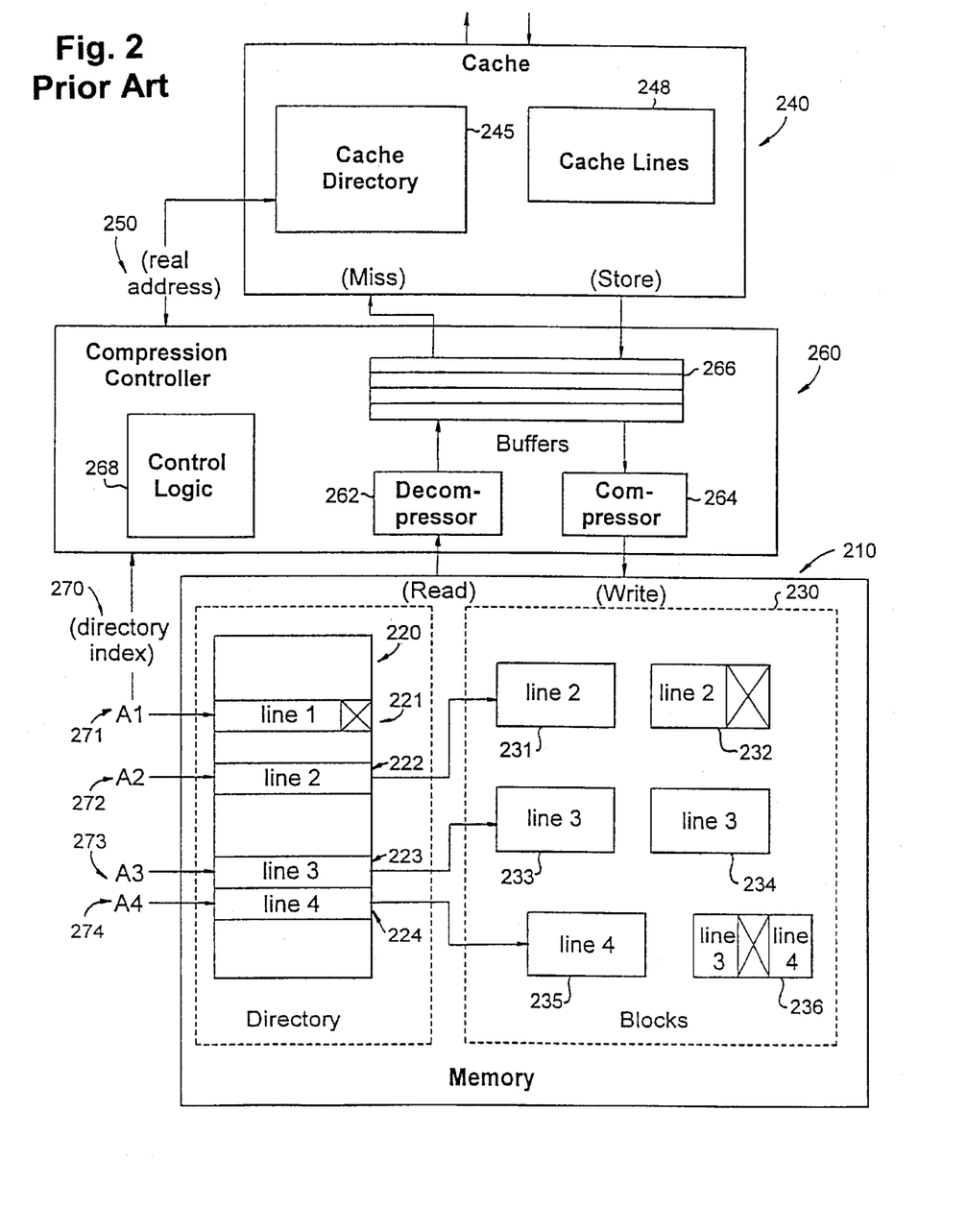
FIG. 2 illustrates a conventional compressed main memory system organization.

FIG. 2 shows in more detail the structure of the cache 104, components of the compression controller 106, and compressed main memory 108 of FIG. 1. The compressed main memory is implemented using a conventional RAM memory M 210, which is used to store a directory D 220 and a number of fixed size blocks 230. The cache 240 is implemented conventionally using a cache directory 245 for a set of cache lines 248. The compression controller 260 includes a decompressor 262 which is used for reading compressed data and a compressor 264 which is used for compressing and writing data, a number of memory buffers 266 used for temporarily holding uncompressed data, and control logic 268. Each cache line is associated with a given real memory address 250. Unlike a conventional memory, however, the address 250 does not refer to an address in the memory M 210; rather, the address 250 is used to index into the directory D 220. Each directory entry contains information which allows the associated cache line to be retrieved. The units of compressed data referred to by directory entries in D 220 may correspond to cache lines 248; alternatively the unit of compression may be larger, that is sets of cache lines may be compressed together. The following examples assume the units of compressed data correspond to cache lines 248. For example, the directory entry 221 for line 1 associated with address A1 271 is for a line which has compressed to a degree in which the compressed line can be stored entirely within the directory entry; the directory entry 222 for line 2 associated with address A2 272 is for a line which is stored in compressed format using a first full block 231 and second partially filled block 232; finally, the directory entries 223 and 224 for line 3 and line 4 associated with addresses A3 273 and A4 274, respectively, are for lines stored in compressed formats using a number of full blocks (blocks 233 and 234 for line 3 and block 235 for line 4) and in which the remainders of the two compressed lines 3 and 4 have been combined in block 236.

As a result of using the directory structure, the time for accessing main memory may be substantially longer than in a computer system that does not use such a directory, even disregarding the times for decompression (for reading from main memory) and compression (for writing to main memory). Thus, to a first approximation, the memory latency for reading a line is doubled as compared to directly addressed memories, since a first main memory access is required to read the directory entry, and in general, at least one additional main memory access is required to read or write the main memory data as specified by the directory entry.

SUMMARY OF THE INVENTION

The present invention is directed to a memory caching system and access methodology wherein some number of recently used directory entries are maintained in a directory cache in fast memory in order to reduce such memory access latency. This directory cache may be implemented as part of the compression controller hardware, or alternatively, part of the memory cache which is immediately above the main memory in the memory hierarchy may be used to store lines of main memory containing directory entries.

Use of the directory caching system of the invention greatly reduces the increased latency problem since on a main memory access in which the required directory entry is found in the cache, the latency is approximately the same as in conventional directly addressed main memory designs.

Advantageously, the directory cache may also contain pre-fetched directory entries, for example, all of the directory entries for the lines in a page or a set of associated pages could be loaded on the first reference to any line in the page or set of pages.

BRIEF DESCRIPTION OF THE DRAWINGS

These and other features, aspects, and advantages of the apparatus and methods of the present invention will become better understood with regard to the following description, appended claims, and accompanying drawings where:

DETAILED DESCRIPTION OF THE DRAWINGS

Figure 3:
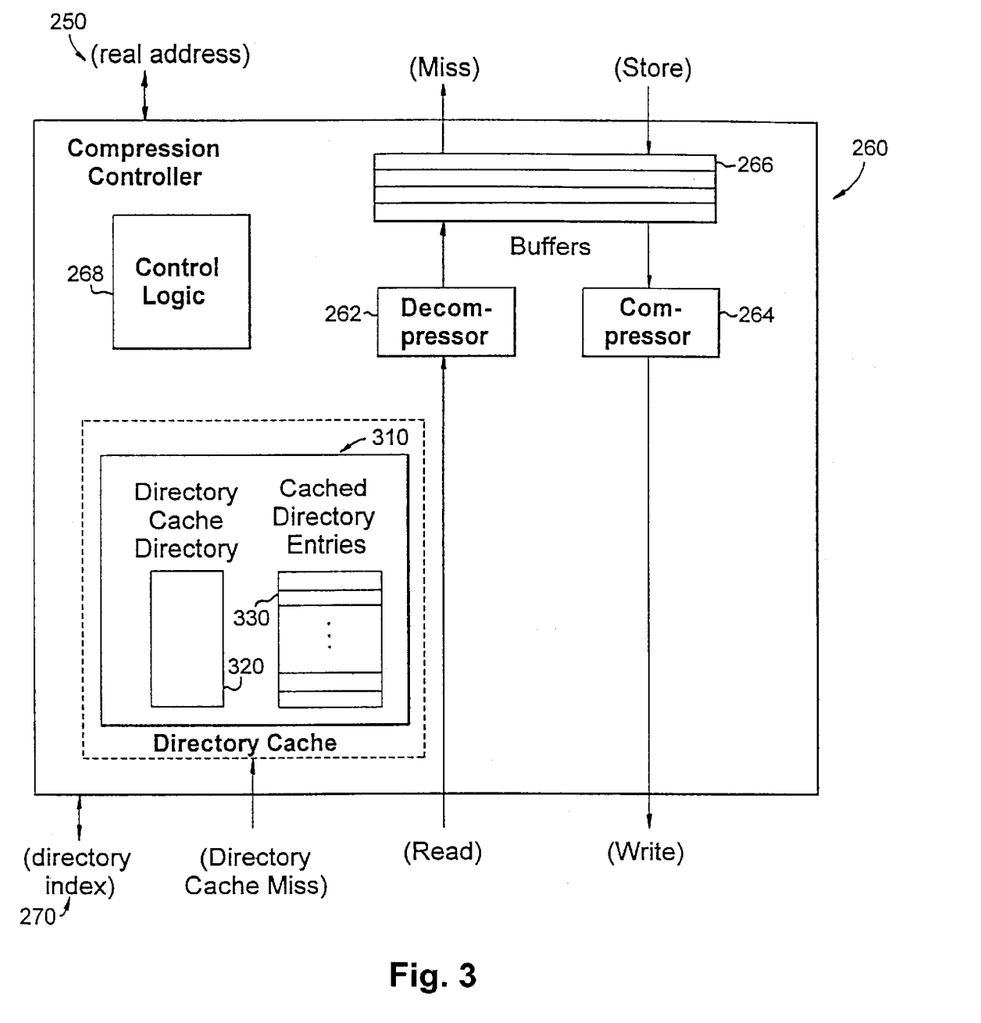
FIG. 3 depicts the improved directory cache system according to a first embodiment of the invention.

FIG. 3 illustrates a first embodiment of the invention for providing a cache of previously accessed directory entries.

As shown in FIG. 3, the compression controller 260, in addition to the previously described decompressor 262, compressor 264, buffers 266, and control logic 268 components, now includes a directory cache 310. The directory cache 310 is implemented using conventional techniques: there is a directory cache directory 320 which records the current contents (at any point in time) of the directory cache, and a number of cached directory entries 330, each of which is a copy of a previously accessed directory entry in the directory D 220 of FIG. 2.

Figure 4:
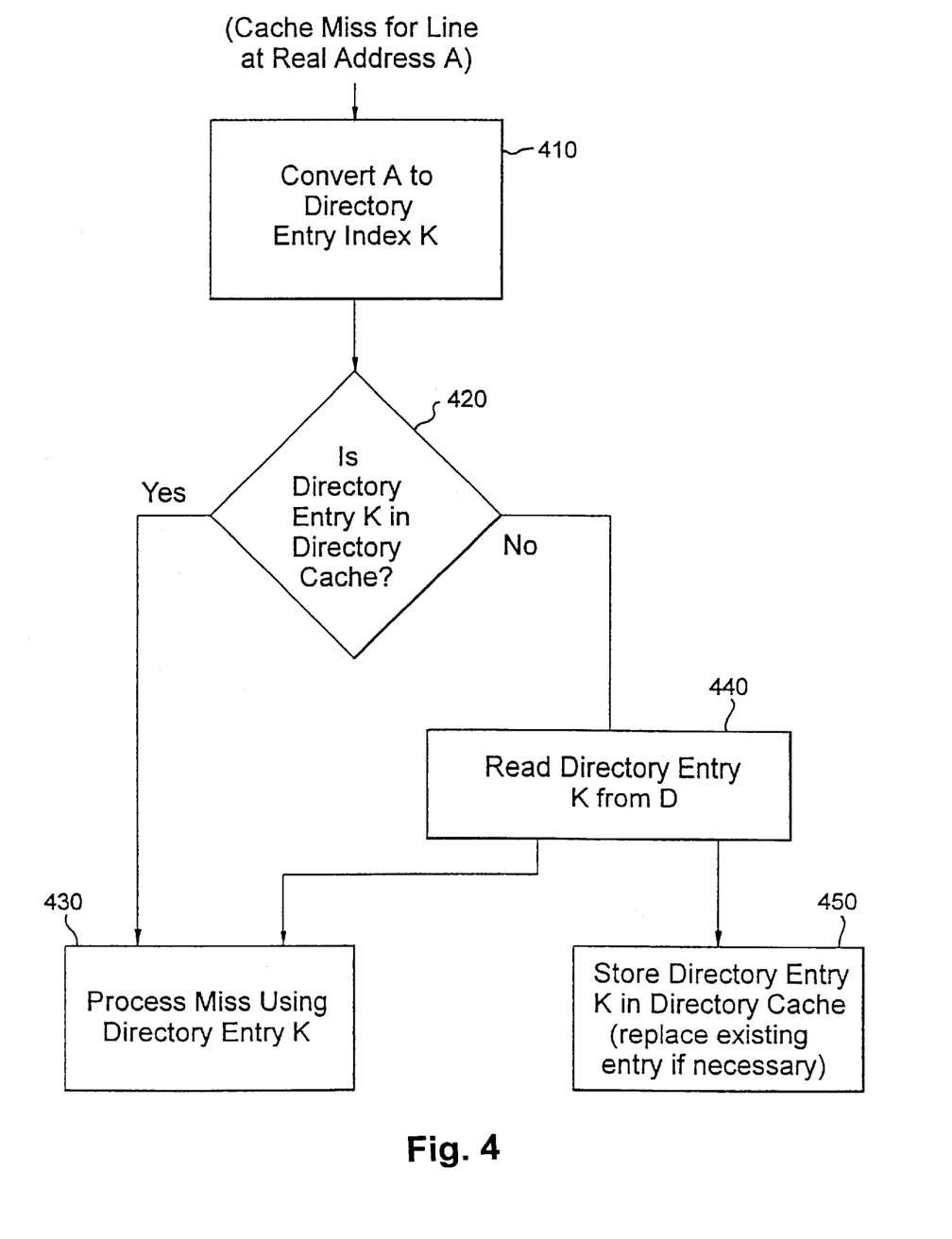
FIG. 4 depicts a control flow for use with the directory cache system of the first embodiment of the invention.

FIG. 4 illustrates the control flow of the compression controller 260 for using the directory cache 310 of FIG. 3 in handling a cache miss. In step 410, the real memory address A for which the miss occurred is converted to a directory index K. In step 420, a comparison is made to determine, utilizing the directory cache directory 320 of FIG. 3, if the directory entry at directory index K, hereinafter referred to as directory entry K, is currently in the set of cached directory entries 330 of directory cache 310 (FIG. 3). If the directory entry at directory index K is currently found in the set of cached directory entries 330, the compression controller 260 processes the miss using the cached copy of directory entry K as indicated at step 430, FIG. 4. Thus, having found the directory entry in the cache, the compression controller need only make a single reference to main memory in order to obtain the compressed memory data. It should be understood that if the request is a directory entry for a line of data that compresses enough so that the entire compressed line fits in the directory entry, then there is no need to read the main memory at all, i.e., the memory contents are compressed in the directory entry itself.

Otherwise, if the directory entry at directory index K is not found in the set of cached directory entries 330, then at step 440, the directory entry K is read from directory structure D 220 (FIG. 2), and in step 450 directory entry K is stored in the directory cache (330 in FIG. 3). As in a conventional cache, storing a new entry in the directory cache 310 may require replacement of an existing entry if the location for storing the new entry is currently occupied. Last, executing concurrently with step 450, at step 430, the cache miss is processed using the copy of directory entry K that was read in step 440.

In processing a cache line store (e.g., for a modified line), the compression controller 260 reads the directory entries for the lines associated in a cohort with the line being stored, where a cohort is a set of associated lines for which fragments (partially filled blocks used to store compressed lines) can be combined, such as described in the above-mentioned background references, and in the reference entitled "Design and Analysis of Internal Organizations for Compressed Random Access Memories," by P. Franaszek and J. Robinson, IBM Research Report RC 21146, IBM Watson Research Center, Oct. 20, 1998, the contents and disclosure of which is incorporated by reference as if fully set forth herein, and, additionally may find free blocks to store the modified line, or free previously allocated blocks. For each such directory entry examined, if the directory entry is found in the directory cache 310, then the cached copy may be used as in steps 420 and 430 of FIG. 4. In the case of directory entries that are not in the directory cache 310 at the beginning of cache line store processing, and for modified directory entries at the end of cache line store processing, there are the following alternatives: 1) do not store a new directory entry in the directory cache 310, and write back to D 220 all modified directory entries; 2) store each new directory entry in the directory cache 310 replacing an existing entry, if necessary, and write back to D 220 all modified directory entries; and 3) store each new directory entry in the directory cache 310 replacing an existing entry, if necessary, but do not write back any modified directory entries until they are replaced. Cases 2) and 3) reflect uses of conventional techniques for cache design: 2) corresponds to a "store-through" cache, and 3) corresponds to a "store-in" cache. Case 1) corresponds to a store-through cache in which, however, storing new cache entries is temporarily disabled for the duration of cache line store processing. In the case of a store-in directory cache 310, in step 450 of FIG. 4, if a directory entry is selected to be replaced, then if it is marked as modified it is written back to D 220 before being replaced.

As an example, a cohort of size 4 may mean the provision of a set of 4 1K lines, and logic is provided that allows any combination of any fragments in those 4 lines. So, for example, for the cohort of size 4, the fragments in lines 1 and 2 may be combined into one block and the fragments in lines 3 and 4 may be combined into another block. Thus, in processing a store of a modified line of a cohort of size 4, for example, the compression controller may have to look at four directory entries which indicate for each line in the cohort, how many blocks it is using and how full the last block is. The system must look at the directory entries for the cohort, i.e., the three other directory entries associated with the line being stored, so that all the information needed to store that modified line including: 1) how full the fragments are; 2) whether the fragments in the other lines are already combined; or 3) if they are not combined, how full they are, may be determined. From this information, therefore, it is determined whether the fragment of the line to be stored may be combined with the fragment of the other lines. Thus, all the directory entries for each line in the cohort have to be read in order to do a store, not just one as for a miss operation. According to the invention, the recent cache directory entries in directory entry cache 310 (FIG. 3) of the compression controller 260 are first checked. If they are found in the directory entry cache 310, then they are used. This greatly improves performance as the need to read all directory entries in the main memory for each store operation is obviated. If the directory entry is not in the directory cache 310, then it has to be read from main memory. In either event, after it is determined whether a fragment of a modified line may be combined with another fragment from another line in the cohort, the directory entries may have to be modified and the standard store-through and store-in alternatives mentioned may be applied in this context.

Figure 5:
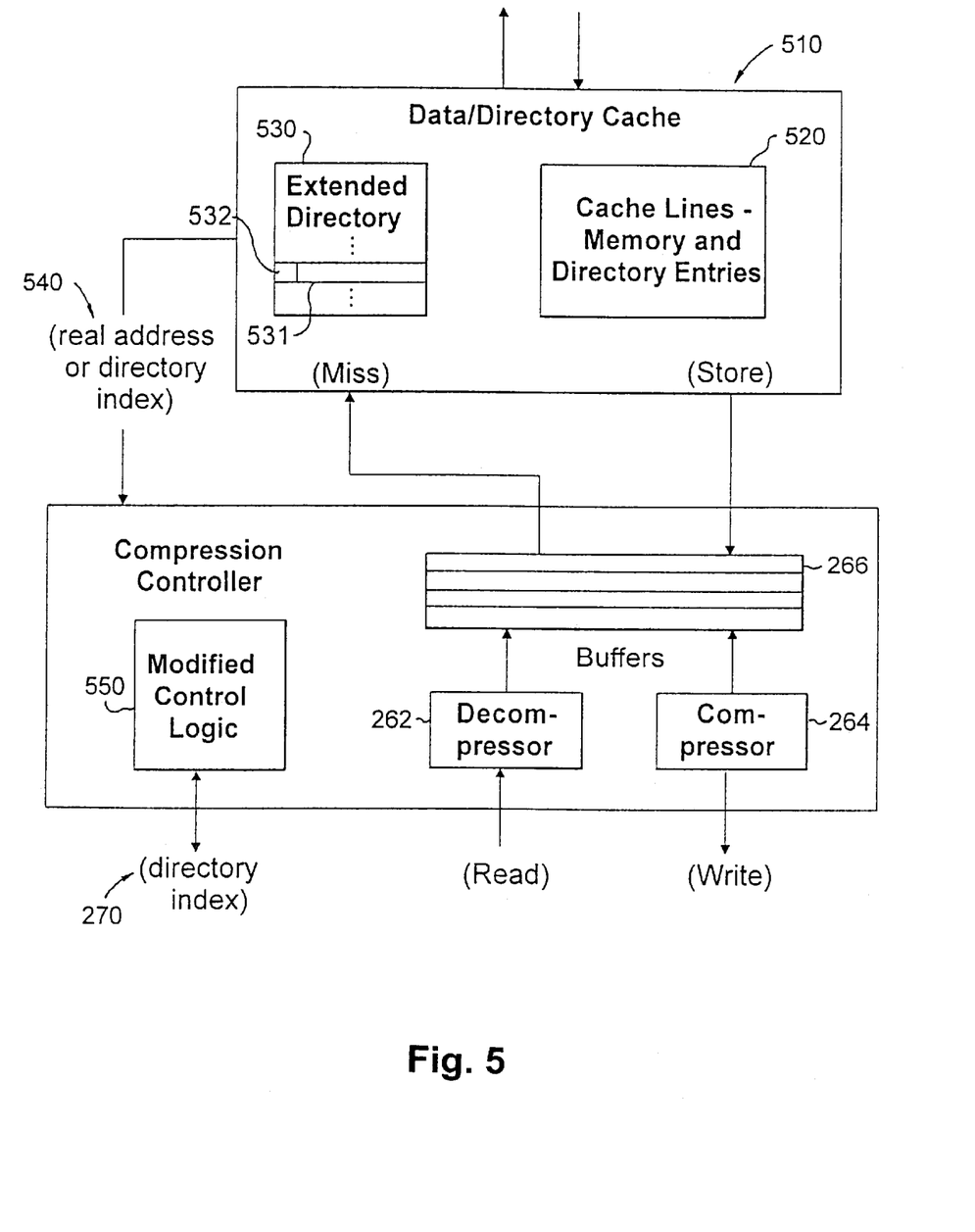
FIG. 5 depicts the improved directory cache system according to a second embodiment of the invention wherein a memory cache is used for data and directory entries.

FIG. 5 shows a second embodiment of the invention in which a directory cache is not included as part of the compression controller as in the first embodiment depicted in FIG. 3; instead, the set of cache lines 248 previously shown for the system cache 240 (FIG. 2) are used to store both memory data and sets of directory entries 520. Accordingly, as shown in FIG. 5, a new data/directory cache 510 is provided having an extended cache directory 530 (i.e., extending the cache directory 245 of FIG. 2) for recording whether each cache line contains memory data or directory entries. Additionally, the control logic 268 of the compression controller 260 is modified to become control logic component 550 which is enabled to check the data/directory cache 510 for previously accessed directory entries.

In more detail, the system illustrated by FIG. 5 operates as follows: First, as the new cache lines 520 in the data/directory cache 510 may contain either memory data or cached directory entries, a mechanism is provided for the extended cache directory to distinguish those cache lines that comprise memory data from those that comprise cached directory entries. This is accomplished by extending cache directory entries in a cache such as that shown as 245 in FIG. 2 with an additional bit, resulting in an extended directory 530 having entries 531 with each entry including an extended bit 532 for indicating that cache line content in which a "0" extended bit indicates that the cache line contains memory data, with the address specified by the remainder of the cache directory entry, and in which a "1" extended bit indicates that the cache line contains a set of directory entries from D 220, with the remainder of the cache directory entry specifying the first directory index in D 220 for the first such cached directory entry. However, in some system designs, an extended bit may not be necessary. For example, if a second level directory is provided to the directory D 220 as described in commonly-owned copending U.S. patent application Ser. No. 09/229,057, entitled METHOD AND APPARATUS FOR ADDRESSING MAIN MEMORY CONTENTS INCLUDING A DIRECTORY-STRUCTURE IN A COMPUTER SYSTEM, the contents and disclosure of which is incorporated by reference as if fully set forth herein, then there are unique real memory addresses associated with each directory entry in D 220, in which case a set of directory entries could be stored in a cache line 520 and referenced in the cache directory 530 using the real address associated with the first directory entry in the set.

As in the first embodiment, it is understood that accessing the cache is typically an order of magnitude faster than accessing main memory. However, it is understood that after the directory entry has been found, compressed memory (blocks) may have to be read out in main memory as well. The special case where the data compresses so much that it that it may be entirely stored in compressed form in the directory entry in the cache of the second embodiment, is applicable as well.

The number of directory entries from D 220 that may be stored in each cache line 520 depends on the sizes of cache lines and directory entries. For example, each cache line 520 may be 64 bytes in length and each directory entry in D 220 could be of size 16 bytes, in which case each cache line 520 could hold either 64 bytes of memory data or four directory entries. It should be understood that, for this cache line size, in order to yield acceptable compression, the unit of compressed data would, in general, consist of multiple cache lines, as previously described: for example, 16 64 byte lines may be compressed together for a compression unit of 1024 bytes. In the case of the example 64 byte cache lines 520, directory entries would be grouped into sets of four, and stored together in each cache line 520. Assuming directory indexes 270 are based at zero (0) and increase by one for each subsequent index, for example, the first such set consists of those directory entries with indexes 0, 1, 2, 3; the next such set would consist of those directory entries with indexes 4, 5, 6, 7; and so on. Each such group of directory entries is referred to herein as a directory entry set. Directory entry sets may in some cases coincide with cohorts (as previously described), but this is not required. In the case that directory entry sets coincide with cohorts, or multiples of cohorts, improved performance is in general also attained for memory management operations of the compression controller 260, in addition to improved memory access performance.

Figure 6:
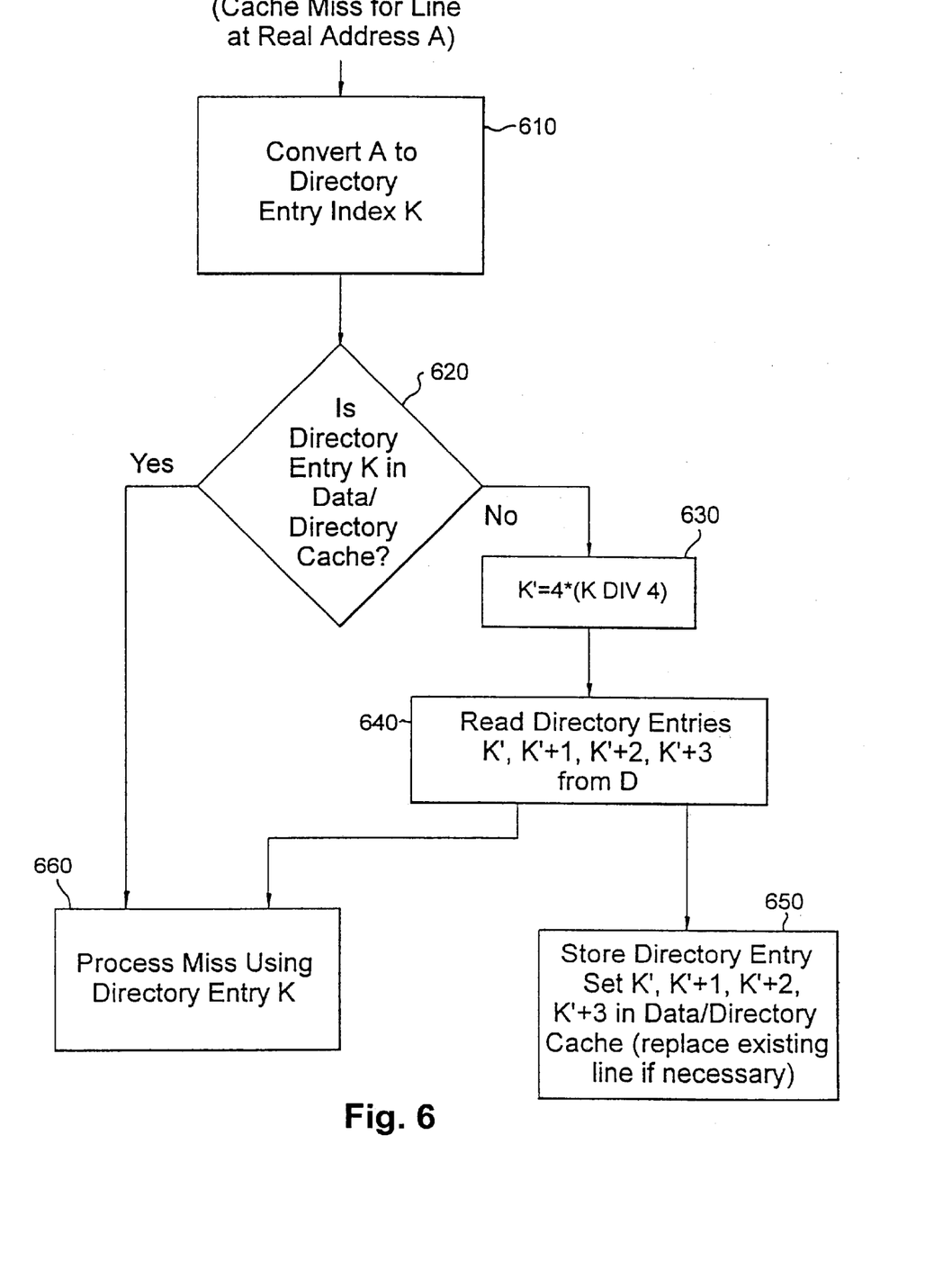
FIG. 6 depicts the control flow for use of the data/directory cache implementing directory entry sets according to the second embodiment of the invention.

Assuming directory indexes are as previously described, and that directory entry sets are of size four, the control flow of the modified control logic 550 for processing a cache miss is illustrated in FIG. 6. In step 610, the real memory address A for which the miss occurred is converted to a directory index K. Next, at step 620, using the extended directory 530 of FIG. 5, it is determined whether the directory entry K is currently in the data/directory cache 510. If the directory entry K is currently in the data/directory cache 510, then the compression controller 260 processes the miss using the cached copy of directory entry K in step 660. Otherwise, if the directory entry K is not in the data/directory cache 510 at step 620, then at step 630, the directory index K' for the first directory entry in the directory entry set is found by setting K' equal to 4*(K DIV 4), where "DIV" indicates integer division. It should be understood that computing 4*(K DIV 4) is equivalent to clearing the two low order bits of entry K. Next, in step 640, each directory entry in the directory entry set is read from D (220 in FIG. 2), and in step 650 the four directory entities comprising the directory entry set are stored as a cache line 520 in the data/directory cache 510. Last, in parallel with step 650, in step 660 the miss is processed using the copy of directory entry K read in step 640.

As an example, if the cache 510 maintains 64 bytes of data lines and a directory entry is 16 bytes, with a directory set being of size four (4), then each entry in this data directory cache 510 holds either 64 bytes of uncompressed memory data or, it can hold four directory entries (one directory set). For purposes of explanation, it is assumed that the cache 510 holds directory entries, with the first four directory entries being 0, 1, 2, 3; the next four being 4, 5, 6, 7, etc. If it is desired to access some random directory entry K, e.g., directory entry number K=7, the directory set to be accessed is 4, 5, 6, 7. To find the starting point, i.e., first directory entry of the set, using the computation K'=4*(K DIV 4): 7 divided by 4 is 1¾, the fraction is disregarded and the result obtained is 1; 1 times 4 is 4, so that would be the starting point.

The mechanisms and alternatives for handling a cache store using the data/directory cache 510 are analogous to the store-in, store-through strategies previously described for the directory cache 310 of the first embodiment of the invention described with respect to FIG. 3. However, when a modified data line is replaced, for a store-in cache, it is necessary to compress the line, which requires access to directory entries, and if these directory entries are stored in the data/directory cache 510 without regard to the current status of any lines being replaced, this could lead to a second cache store. That is, if a modified data line is to be replaced, not one with directory entries, but the one with data, and if it is a store-in cache (some of these lines have been modified), then before the line can be replaced, it must be written back out of the cache which requires recompression as it is going to be written through to main memory. In order to recompress this line, a set of directory entries may have to be read out, e.g., for the cohort. If those directory entries are randomly stored in the cache without looking at the status of the lines to be replaced, another modified line, e.g., a data line, might end up being replaced and a loop is entered because the system would now have to read another set of directory entries. One solution is to allow lines consisting of directory entry sets to replace only other lines containing directory entry sets or unmodified data lines. In the case that a directory entry set cannot be stored in the cache since all potential lines that could be used to store the directory entry set are modified data lines, the directory entries would, in this case, not be cached, and the compression controller would access the directory entries from the directory D 220.

The caching of directory entry sets, as described with reference to FIG. 6, may lead to improved performance as compared to caching individual directory entries as illustrated in FIG. 4, for example. This is due to the fact that the directory entries in a directory entry set are typically logically related; for example, if each directory entry refers to 1024 bytes (before compression) of compressed data, then the four directory entries in a directory entry set correspond to one 4K page (a typical page size in many current computer systems). It is common for related data to be accessed in a short period of time and, therefore, the result of caching directory entry sets is to prefetch directory entries that are likely to be required in the near future. Also, as mentioned above, improved performance can be attained for memory management operations of the compression controller in the case that directory entry sets correspond to cohorts or multiples of cohorts. This technique can also be used in the context of the first embodiment as illustrated in FIGS. 3 and 4. For example, in steps 440 and 450 of FIG. 4, in addition to reading and storing directory entry K, the remaining directory entries in a directory entry set can be read from the directory D 220 and stored in the directory cache 310 of FIG. 3.

Although a detailed description is provided for the case of indirectly addressed main memory as used in a compressed main memory system, it should be understood that the invention can also be used for other applications of indirectly addressed main memory.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

What is claimed is:

1. A computer system comprising:
   a CPU;
   a compressed main memory for storing data, said compressed main memory including a first directory structure having entries, each entry for storing either one of highly compressible data, a number of main memory block addresses corresponding to memory blocks that store compressed data, or a number of main memory block addresses corresponding to memory blocks that store uncompressed data, wherein a CPU generated real memory address is translated into a first directory index for accessing said data via said first directory structure; and,
   a second directory structure provided in a fast memory having copies of entries corresponding to directory entries included in the first directory structure, wherein said computer system CPU generated real memory address is first translated into a second directory index for enabling direct access either to highly compressible data stored within said copies of directory entries in the first directory structure to result in no main memory access, or direct access to said main memory block addresses corresponding to blocks of data stored compressed or uncompressed in said main memory.

2. The system as claimed in claim 1, wherein said copies of entries include recently accessed first directory entries.

3. The computer system as claimed in claim 1, further including memory control device for translating a CPU generated real memory address into said first directory index, said memory control device further translating a real CPU generated real memory address into said second directory index for accessing a corresponding entry in said second directory structure, said memory control device comparing said second directory index against current indexes of said second directory structure and retrieving corresponding first directory entry contents in said second directory structure when a corresponding index match is found.

4. The system as claimed in claim 3, wherein said memory control device reads said corresponding first directory entry in said first directory structure according to said first directory index when an index match is not found in said second directory structure, said memory control device further storing said entry read from said first directory structure in said second directory structure while processing a cache miss using said entry read from said first directory structure.

5. The system as claimed in claim 4, wherein said memory control device for storing said entry further replaces an existing entry in said second directory structure with said entry read from said first directory structure.

6. The system as claimed in claim 3, wherein said entry includes said highly compressed data, said memory controller comprising a compression control device including said second directory structure.

7. The system as claimed in claim 5, wherein said memory control device implements a store-through strategy whereby new directory entries in said second directory structure are stored in said first directory structure.

8. The system as claimed in claim 7, wherein said memory control device further enables a store-in strategy whereby directory entries to be written to said first directory structure are stored in said second directory structure when they are replaced.

9. The system as claimed in claim 6, wherein one or more directory entries in said first directory structure include pointers to compressed memory contents corresponding to a real memory address generated by said CPU.

10. A method for retrieving memory contents during a cache miss event occurring in a computing system in which a CPU generated real memory address is translated into a first directory index for accessing compressed main memory contents via a first directory structure, said first directory structure having entries, each entry for storing either one of highly compressible data, a number of main memory block addresses corresponding to memory blocks that store compressed data, or a number of main memory block addresses corresponding to memory blocks that store uncompressed data, said method comprising:
   a) providing second directory structure having entries representing previously accessed directory entries in the first directory structure, each entry in said second directory structure having an associated first directory index;
   b) converting said real memory address associated with said first directory index to a second directory index;
   c) comparing said second directory index with first index entries of said second directory structure; and,
   d) accessing one of said entries stored in said second directory structure in response to a first index comparison result, said accessing including direct access either to highly compressible data stored within said copies of directory entries in the first directory structure to result in no main memory access, or direct access to said main memory block addresses corresponding to blocks of data stored compressed or uncompressed in said main memory.

11. The method as claimed in claim 10, wherein step d) alternately includes the step of accessing one of said entries stored in said first directory structure in response to a second index comparison result.

12. The method as claimed in claim 11, wherein after step d) of accessing one of said entries stored in said first directory structure, a further step of storing said directory entry read from said first directory structure in said second directory structure while processing said cache miss using said read directory entry.

13. The method as claimed in claim 12, wherein said step of storing said directory entry read from said first directory structure in said second directory structure further includes the step of replacing an existing entry in said second directory structure with said directory entry read from said first directory structure.

14. A computer system comprising:
   a CPU;
   a compressed main memory for storing data, said compressed main memory including a first directory structure having entries, each entry for storing either one of highly compressible data, a number of main memory block addresses corresponding to memory blocks that store compressed data, or a number of main memory block addresses corresponding to memory blocks that store uncompressed data, and wherein a CPU generated real memory address is translated into a first directory index for accessing said data via said first directory structure;
   a cache storage device having one or more cache lines for storing uncompressed memory data, and one or more lines for storing directory entry sets, a directory entry set comprising copies of a number of directory entries in said first directory structure, said number of copies being chosen so that cache lines comprising uncompressed memory data and cache lines comprising directory entry sets are of equal storage size, and in which at least one of the copies of a directory entry in a directory entry set is a recently accessed directory entry; and,
   means for accessing a cache line of uncompressed memory data or a copy of a directory entry in a cache line including a directory entry set from said cache storage device in response to a CPU generated real memory address.

15. The system as claimed in claim 14, wherein said cache memory storage device includes cache directory structure having entries including a bit flag having a value indicating whether contents of a cache line is either cache memory data or one or more directory entries.

16. The system as claimed in claim 15, wherein when said bit flag is of a value indicating cache memory data cache line, a remainder of said cache directory entry includes an address for accessing said memory data from said cache memory storage device.

17. The system as claimed in claim 15, wherein a cache line contains a set of directory entries corresponding to logically related data.

18. The system as claimed in claim 17, wherein when said bit flag is of a value indicating set of cache directory entries, a remainder of said cache directory entry includes a first directory index for the first entry of said set stored in said first directory structure.

19. The system as claimed in claim 17, wherein said cached directory entry sets facilitates prefetching of directory entries for subsequent use.

20. The system as claimed in claim 14, wherein said CPU generated real memory address indicates whether said contents of a cache line is either cache memory data or one or more directory entries.

21. The system as claimed in claim 15, further including means for storing cache data contents in main memory, said storing means implementing a store-through strategy whereby new cache data contents in said cache directory structure are stored in said first directory structure.

22. The system as claimed in claim 15, wherein said memory control device further enables a store-in strategy whereby cache data contents to be written to memory are stored in said first directory structure when they are replaced.

23. A method for retrieving memory contents during a cache miss event occurring in a computing system in which a CPU generated real memory address is translated into a first directory index for accessing compressed main memory contents via a first directory structure, said first directory structure having entries, each entry for storing either one of highly compressible data, a number of main memory block addresses corresponding to memory blocks that store compressed data, or a number of main memory block addresses corresponding to memory blocks that store uncompressed data, said method comprising:
   a) providing a second cache directory structure having one or more cache lines for storing uncompressed memory data, and one or more lines for storing directory entry sets, a directory entry set comprising copies of a number of directory entries in said first directory structure, said number of copies being chosen so that cache lines comprising uncompressed memory data and cache lines comprising directory entry sets are of equal storage size, and in which at least one of the copies of a directory entry in a directory entry set is a recently accessed directory entry;
   b) converting a real memory address for which said cache miss occurred to a second index for accessing contents of said second cache directory structure;
   c) comparing said second index with first index entries of said second cache directory structure; and,
   d) accessing, in response to a first comparison result indicating an index match, a corresponding cache line entry comprising one of said uncompressed memory data or a copy of a directory entry in a cache line including a directory entry set from said cache storage device and processing said cache miss using said entry.

24. The method as claimed in claim 23, wherein in response to a second comparison result indicating no index match, step d) alternately comprises the steps of:
   converting said second directory index into an index corresponding to a first directory entry of a set of directory entries; and,
   reading each directory entry of said set of directory entries from said first directory structure.

25. The method as claimed in claim 24, wherein after step d) of accessing each entry of said set of entries stored in said first directory structure in response to said second comparison result, a further step of storing each directory entry of said set in said second cache directory structure while processing a cache miss using contents read from an accessed directory entry.

26. The method as claimed in claim 25, wherein said step of storing said cache contents read from said first directory structure in said cache directory structure further includes the step of replacing an existing entry in said cache directory structure with said directory entry read from said first directory structure.

* * * * *